March 31, 1964  L. V. WHISTLER, SR., ETAL  3,126,776
METHOD AND APPARATUS FOR ALIGNING PUNCH AND DIE RETAINERS
Filed Feb. 19, 1962  6 Sheets-Sheet 1

INVENTORS
LAWRENCE V. WHISTLER SR.
LAWRENCE V. WHISTLER JR.

BY *Shoemaker and Mattare*
ATTORNEYS

March 31, 1964 L. V. WHISTLER, SR., ETAL 3,126,776
METHOD AND APPARATUS FOR ALIGNING PUNCH AND DIE RETAINERS
Filed Feb. 19, 1962 6 Sheets-Sheet 4

INVENTOR
LAWRENCE V. WHISTLER SR.
LAWRENCE V. WHISTLER JR.

BY Shoemaker and Mattare
ATTORNEYS

INVENTORS
LAWRENCE V. WHISTLER SR.
LAWRENCE V. WHISTLER JR.

ATTORNEYS

United States Patent Office 3,126,776
Patented Mar. 31, 1964

3,126,776
METHOD AND APPARATUS FOR ALIGNING
PUNCH AND DIE RETAINERS
Lawrence V. Whistler, Sr., 259 Doncaster Road, and
Lawrence V. Whistler, Jr., 251 Doncaster Road,
both of Kenmore, N.Y.
Filed Feb. 19, 1962, Ser. No. 174,203
10 Claims. (Cl. 83—13)

The present invention relates to a new and novel method and apparatus for aligning punch and die retainers, and more particularly to the utilization of a special transfer means or spotting fixture for accomplishing the purposes of the present invention.

In punch and die work, particularly where custom punch and die retainers are employed, it has always been a problem to properly align such punch and die retainers. Obviously, the punch should be as nearly perfectly aligned with the die as possible in order to successfully perform the punching operation, and more importantly to ensure long life and good wearing characteristics of the punches and dies themselves.

If the punches and dies are not perfectly aligned with one another, they soon are damaged to such an extent that they must be replaced, thereby substantially increasing the cost of the punching operation. According to the procedure presently followed in the art, the die retainer is generally first aligned on the associated die shoe and fixed in position. This is a relatively easy operation to perform. Next comes the problem of properly aligning the punch retainer with the die retainer. This procedure in the past has proved to be extremely difficult and very time-consuming. The present invention provides a novel structural arrangement and novel method of aligning the punch and die retainers to overcome the objection to the prior art procedures.

At the present time, it is a common practice to reach into the die set and align the punch retainer with the die retainer and then to insert a scribing tool into the screw receiving openings in the punch retainer and scribe circles on the under surface of the punch. The punch shoe is then removed and the screw receiving holes formed in the punch shoe whereupon the punch retainer is mounted on the punch shoe. This system obviously is difficult to perform and in some cases where the die set is of a large area in size and has a very small vertical dimension or short die space, it is almost impossible to manually carry out this procedure.

Additionally, the prior art procedure as discussed above is not very accurate, and the screw retaining openings are not properly positioned. As a result, the alignment is not sufficiently accurate, and a great deal of time is consumed in carrying out the proper aligning procedures. The problem is further compounded as the number and size of the die components is increased.

These problems are overcome in the present invention by providing an arrangement whereby one of the retainers is initially fixedly secured to its associated shoe, and then a transfer means or spotting fixture is engaged with this retainer and properly aligned therewith.

Spotting means is supported by one end of the transfer means, and incorporates means for providing a visible marking on the other shoe of the exact position at which the retainer screw receiving openings are to be formed.

The spotting means employed may take several forms. For example, in a first form it may comprise a member having cutting portions formed thereon for cutting into the surface of a shoe. In a second form of spotting means, a printing member may be employed which actually prints a visible mark on a shoe coming in contact therewith. In a still further form of spotting means, a thin sheet of material having suitable marks thereon is provided with an adhesive substance which is adapted to engage a shoe coming in contact therewith and adhere the sheet of material thereto such that the sheet of material will be removed with the shoe after the shoe has contacted the spotting means. It will be apparent that in each of these various forms of the invention, a clear visible indication is provided on the punch holder having contacted the spotting means whereby a fool-proof method of accurately forming the screw receiving openings in such punch holder is provided.

In a still further modified form of the transfer means, a remotely power actuated arrangement is provided for accomplishing the same purposes.

After having marked the location of the screw receiving openings in the punch holder as above discussed, such openings are then made in the shoe and a second retainer then mounted on the shoe and properly aligned therewith and finally secured in a fixed desired position on the shoe.

This over-all method results in an extremely accurate alignment of the punch and die retainers, and also very substantially reduces the amount of time involved in carrying out the aligning procedure. In a normal aligning process, the method according to the present invention results in a saving of between 25 percent and 50 percent of the assembly time, and furthermore, as the size and number of the die sets to be assembled increase, the savings in time are even greater.

Novel punch and die retainers are also provided with special screw receiving openings. These openings are so constructed that they are suitable for face-mounting or back-mounting to an associated shoe. This, of course, increases the versatility of the retainers since they may be utilized in either manner in accordance with the requirement in any particular case. This obviously represents a great improvement over conventional punch and die retainers which are limited to use either as a face-mounted retainer or a back-mounted retainer, or on the other hand, may require the employment of additional parts in order to adapt the retainers for one use or the other.

A further problem encountered with the utilization of punch and die retainers as employed in the present invention is the fact that in fast speed, high production punching operations, the dowels employed for assuring accurate alignment of the retainers sometimes work loose, and particularly in the case of the punch retainers the dowels may drop out of the dowel receiving openings. This of course is very undesirable since once the dowels have dropped out of the aligned dowel openings, the retainer may very well move out of its proper operative position, thereby substantially increasing the wear and reducing the life of the punch and die members.

In order to prevent the dowels from escaping from the dowel receiving openings in the retainers of the present invention, a special construction is provided whereby a tapered plug member is threaded into the outer end of the dowel receiving openings to positively prevent the escape of the dowels.

In this manner, the dowels are retained in position in an extremely simple and effective manner. The punch retainer according to the present invention incorporates a further feature which results in substantial advantages. In punch retainers, it is necessary to provide a back-up means for the punch since the forces applied to the punch are concentrated in a relatively small area and it is not practical to allow the end of the punch to abut directly on the face of the punch shoe since the force applied by the punch would soon damage the face of the punch shoe. Accordingly, it has been a general practice to provide a hardened back-up plate for the punch which is adapted to absorb the loads of the punch and to spread them over a greater area on the punch shoe. These back-up plates have proved unsatisfactory in retaining proper alignment of the punch retainer since the retaining screws and dowels which extend through the punch retainer must then extend through clearance openings in the back-up plate before entering the corresponding openings in the punch shoe. This arrangement permits a certain amount of movement between the punch retainer and the punch shoe which causes the punch retainer to move out of proper alignment with the die retainer.

These problems involved due to the necessity of employing a separate back-up plate in the prior art are eliminated in the present invention providing a punch retainer arrangement wherein a built-in back-up insert is actually incorporated in the body of the punch retainer and is retained in position with the outer surface of the back-up insert flush with the adjacent surface of the punch retainer. This permits the punch retainer and its associated back-up insert to be mounted flush against the under surface of the punch shoe thereby eliminating the above-discussed problems encountered when a separate back-up plate having clearance openings therethrough is employed. The back-up insert of the present invention does successfully perform the same function as the back-up plate employed in the prior art, and spreads the forces from the punch over a broad enough area to prevent any damage to the punch shoe.

An object of the present invention is to provide a new and novel method of aligning punch and die retainers with greater accuracy than heretofore obtained in the prior art.

Another object of the invention is the provision of a method for aligning punch and die retainers which results in a considerable saving of time in carrying out the necessary procedure as compared to prior art procedures.

A further object of the invention is to provide a new and novel transfer means or spotting fixture which is quite simple and inexpensive in construction, and yet which is efficient and reliable in use and provides a clear visible indication of the exact location of holes to be made in a punch or die shoe.

A still further object of the invention is to provide a new and novel transfer means which is adapted to be remotely power operated.

Still another object of the invention is the provision of novel punch and die retainers provided with special retaining screw receiving holes to permit either face-mounting or back-mounting of the retainers on associated shoes.

Another object of the invention is to provide novel retainers including means for positively retaining dowels in operative position therewithin and preventing accidental escape of the dowels.

A still further object of the invention is to provide a new and novel punch retainer with a built-in back-up insert which eliminates the necessity of providing a separate back-up plate as employed in the prior art and which enables the punch retainer to directly abut the face of an associated punch shoe.

Other objects and many attendant advantages of the invention will become more apparent when considered in connection with the specification and accompanying drawings wherein:

FIG. 15a is a sectional view of the lower portion of the transfer means illustrating the cavity for receiving a ring insert;

FIG. 15b is a sectional view illustrating a ring insert for cooperation with the structure shown in FIG. 15a;

Figures 1, 2, 3:
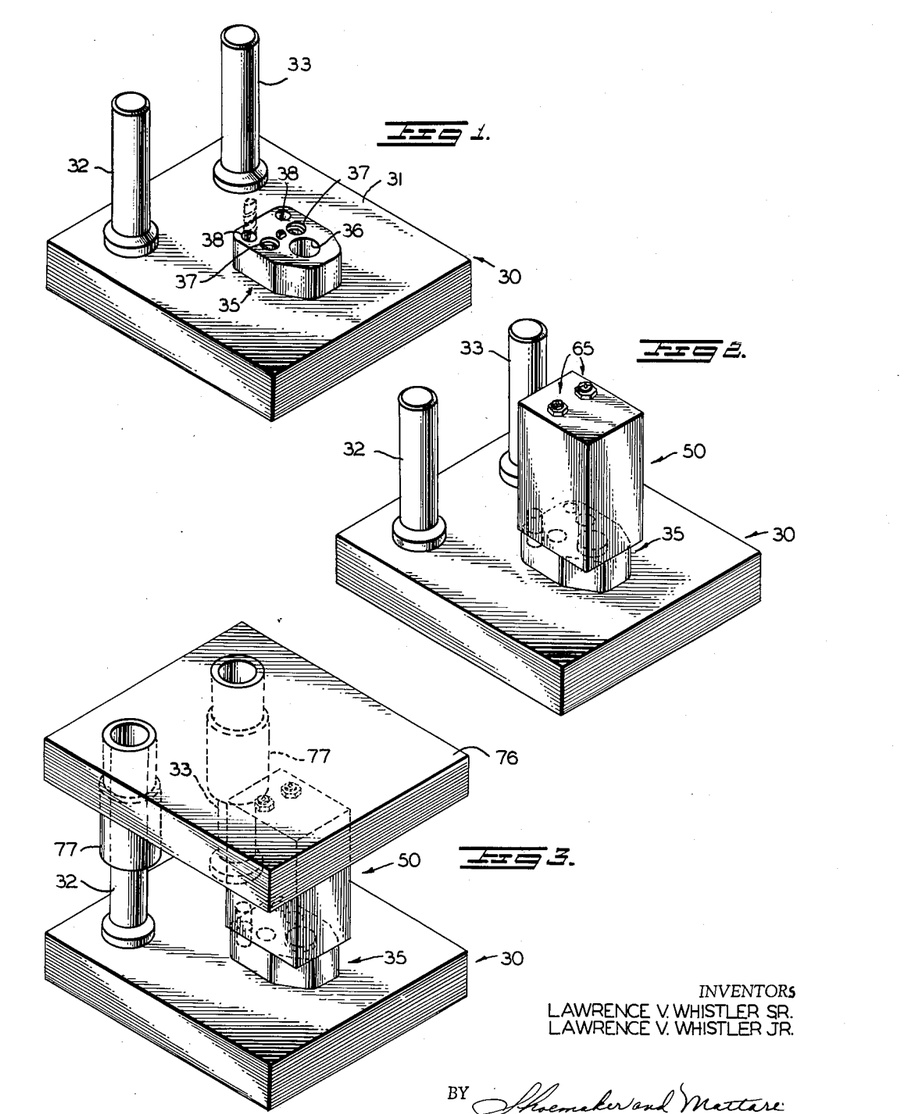
FIG. 1 is a perspective view illustrating a die retainer in place on a die shoe in the initial stage of the method according to the present invention.
FIG. 2 illustrates a further stage of the novel method with the transfer means in place on the die retainer.
FIG. 3 illustrates a still further step in the method of the present invention, wherein a punch shoe has been placed over the die shoe.

Referring now to the drawings wherein like reference characters designate corresponding parts throughout the several views, there is shown in FIG. 1 a conventional die shoe indicated generally by reference numeral 30 and including an upwardly facing surface 31 from which extend vertically upwardly conventional guide posts 32 and 33. A die retainer indicated generally by reference numeral 35 is shown as disposed upon the upper surface 31 of the die shoe.

The die retainer 35 includes a die receiving opening 36, a pair of retaining screw receiving openings 37, and a pair of dowel receiving openings 38. The construction of the die retainer may be understood more clearly from an inspection of FIG. 4 of the drawings wherein it will be seen that the die receiving opening 36 as well as the screw receiving openings 37 and dowel receiving openings 38 extend vertically through the thickness of the die retainer.

It will be noted that the screw receiving openings 37 include a lower threaded portion and an upper unthreaded counterbored portion 37', the purpose of this construction being hereinafter more fully set forth.

In carrying out the method of the present invention, it should be understood that either the die retainer may be first placed on the die shoe, and then the punch retainer aligned therewith, or the punch retainer may be first mounted on the punch shoe and then the die retainer aligned therewith. For the purposes of the present invention, the most common procedure will be described, wherein the die retainer is first fixed in position and the punch retainer is then aligned therewith.

As seen in FIG. 1, the first step of the method as disclosed herein is to place the die retainer on the upper surface of the die shoe and properly place or spot the die retainer in position. It is then a simple matter to insert a scribing instrument through the retaining screw receiving holes 37 in the die retainer and to scribe suitable marks on the upper surface of the die shoe. The die retainer is then removed and holes are drilled and tapped in the die shoe in accordance with the scribed marks thereon.

Figure 4:
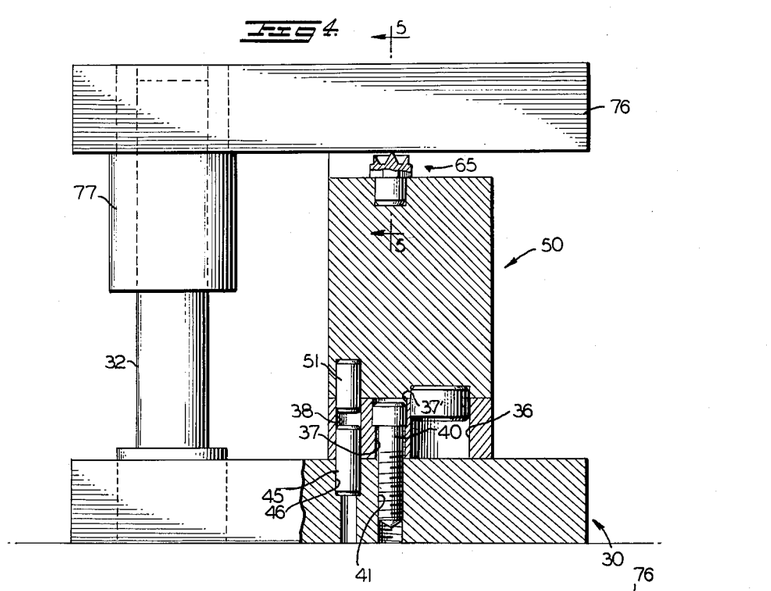
FIG. 4 is a side view of the assembly as seen in FIG. 3, partially in section, illustrating certain details of construction.

The die retainer is then again mounted on the upper surface of the die shoe, and retaining screws inserted in operative position. As seen in FIG. 4, one of the retaining screws is indicated by reference numeral 40, the retaining screw having an enlarged head portion which is seated on the counterbored portion 37' of the screw receiving hole in the retainer, the lower threaded shank portion of the portion of the screw being threaded into the opening 41 which has been drilled and tapped in the die shoe 30.

It will be understood that after having threaded the retaining screws 40 loosely into the position shown in FIG. 4, the die retainer is adjusted to its final position, and then the screws 40 are tightened to firmly secure the die retainer in position on the die shoe.

After the screws 40 have been tightened up, the die shoe is drilled and reamed by inserting drilling and reaming tools through the dowel holes in the die retainer. In other words, the dowel receiving holes in the die retainer serve as guides for the drilling and reaming tools whereby perfect alignment of the dowel receiving holes drilled and reamed into the die shoe with those of the die retainer is assured.

As seen in FIG. 1, a portion of a drill is illustrated in phantom line extending down through one of the dowel receiving openings in the die retainer, it being understood that this drill will pass downwardly into the die shoe to form an aligned dowel receiving hole in the die shoe.

The next step is to then insert dowels into the dowel receiving opening and to drive the dowels into their operative position by means of a pin punch or the like. As seen in FIG. 4, a dowel 45 is illustrated in its operative position after having been driven home, the dowel being disposed within a dowel receiving opening 38 in the die retainer and an aligned dowel receiving opening 46 formed in the die shoe as discussed above.

After having driven the dowels home, the die retainer is then securely attached to the die shoe in its fixed final position, and obviously, the retaining screws and dowels prevent any relative movement between the die retainer and its associated die shoe.

It is then necessary to properly align the punch retainer with the die retainer which is mounted in its final position. In order to properly mark the position of the mounting holes for the retaining screws of the punch retainer, a new and novel transfer means is employed, the transfer means being indicated generally by reference numeral 50, as seen in FIGS. 2, 4, 14a and 15a.

The transfer means or spotting fixture as it may be termed may, of course, assume various configurations, and as shown in the drawings, comprises a substantially rectangular block of material such as steel or cast iron, the construction being such that tipping or tilting of the fixture is prevented and furthermore, the fixture is provided of sufficient strength so as to prevent bending or distortion thereof when under load, the structure, of course, being sufficiently strong to readily withstand the forces acting thereon.

The lower end portion of the transfer means is provided with aligning means to assure that the transfer means is properly aligned with the associated retainer which in this case is the die retainer, and to assure that there is no relative rotation between it and the associated retainer. As seen in the drawings, a first downwardly directed dowel 51 is fixed within a suitable opening provided in the lower portion of the transfer means, this dowel being adapted to fit within the upper portion of one of the dowel receiving openings of the associated retainer.

Figures 15A, 15B:
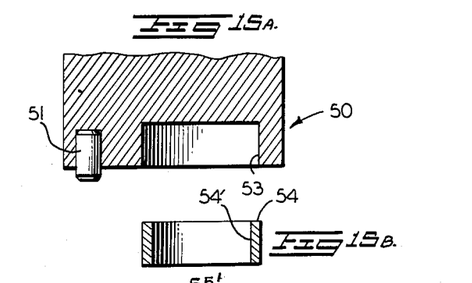
Figure 15C:
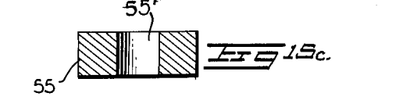
FIG. 15c is a sectional view of a modified ring insert.

In addition, as seen particularly in FIG. 15a the transfer means is provided with a cylindrical recess 53 in spaced relation to the dowel 51. The cylindrical recess 53 as seen in FIG. 15a is adapted to fit about a die bushing extending upwardly from the die retainer or a die button which may be disposed within the opening 36 in the die retainer. Obviously, with the dowel 51 of the transfer means disposed within one of the dowel receiving openings in the die retainer and with the cavity 53 snugly receiving a die bushing or die button, the transfer means may be positively aligned with respect to the die retainer, and there can be no relative rotation therebetween. In order to increase the versatility of the transfer means such that it may be readily employed with die bushings or die buttons of various sizes, ring inserts having central openings of different sizes may be employed, and as seen in FIG. 15b, one such ring insert 54 is illustrated and FIG. 15c illustrates a further form of insert which may be employed. It is apparent that the central openings 54' and 55' provided through ring inserts 54 and 55 respectively are of different diameter so as to accommodate die bushings or die buttons of corresponding diameters.

On the other hand, if no die bushing or die button is inserted within the die receiving opening 36 of the die retainer, a plug insert such as illustrated by reference numeral 57 in FIG. 14a may be inserted within the cavity 53 in the lower portion of the transfer means, the plug insert fitting down within the die receiving opening in the die retainer.

Figure 14A:
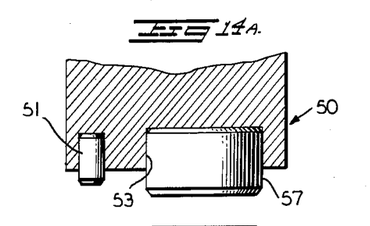
FIG. 14a is a sectional view illustrating the construction of the lower portion of a transfer means with a plug insert therein.
Figure 14B:
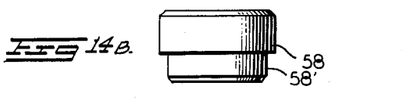
FIG. 14b illustrates a modified plug insert.

In order to further enhance the versatility of the arrangement shown in FIG. 14a, plug inserts of different diameters may be employed, and a first modification is shown in FIG. 14b, wherein the plug insert 58 has a lower portion 58' of reduced diameter as compared to that shown in FIG. 14a.

Figure 14C:
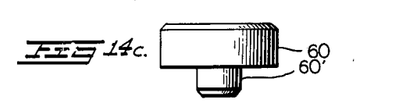
FIG. 14c illustrates a still further modified plug insert.

A further form of plug insert 60 as shown in FIG. 14c has a lower portion 60' of substantially reduced diameter for fitting within a correspondingly sized die receiving opening in a die retainer.

As seen in FIGS. 2 and 4, the spotting fixture means is shown as mounted upon the die retainer in operative position. The spotting fixture is also provided with spotting means at the end thereof opposite to the end at which the aligning means is disposed, the spotting means as shown in FIGS. 2 and 4 being indicated by reference numeral 65. The construction of this spotting means is shown in greater detail in FIG. 5, wherein it will be seen that each of the spotting means 65 includes a body portion 66 formed of steel or the like including a downwardly extending tapered shank 67 which is threaded within a correspondingly threaded opening 68 provided in the end portion of the spotting fixture. In this manner, the spotting means are removably secured to the spotting fixture.

Each of the spotting means 65 also includes an upwardly extending central conical shaped portion 70 which terminates in a sharp prick point 71. This central conical portion of each of the spotting means is surrounded by a spaced annular wall portion 73, the upper end of which terminates in a sharp annular cutting edge 74. It will be noted that the prick point 71 extends longitudinally of the spotting means slightly beyond the cutting edge portion 74 thereof such that the prick point 71 will first contact an associated shoe whereupon the cutting edge 74 will subsequently contact the shoe. The spotting means may also take other forms as hereinafter described.

After the spotting fixture has been assembled in the operative position as seen in FIG. 2, the next step of the method is to provide a punch shoe 76 as seen in FIG. 3 having downwardly directed guide bushings 77 which are adapted to receive the upwardly extending guide rods 32 and 33 of the die shoe. The die set is assembled as seen in FIG. 3 with the guide rods received in the guide bushings, and the punch shoe 76 is lowered to a point where the under surface thereof contacts the spotting means at the upper end of the spotting fixture as seen in FIG. 4.

Figures 5, 6:
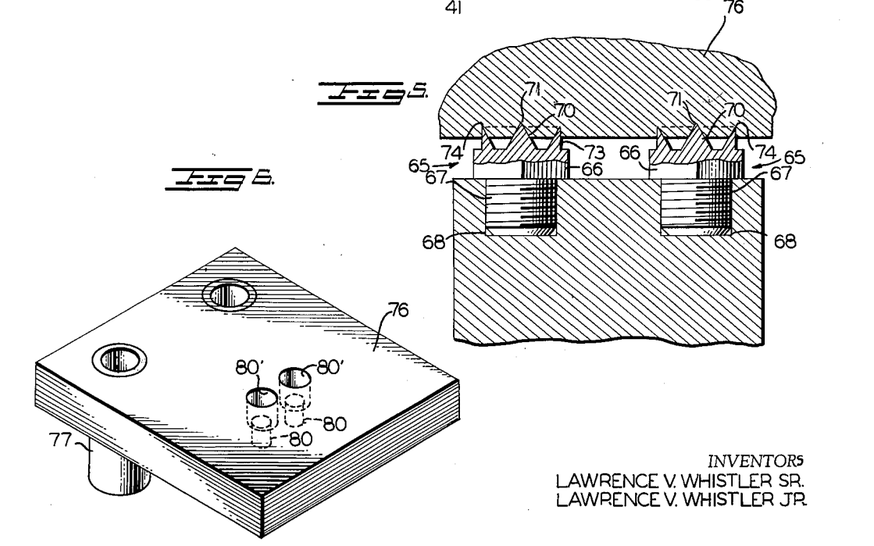
FIG. 5 is a sectional view taken substantially along line 5—5 of FIG. 4 looking in the direction of the arrows.
FIG. 6 is a perspective view of the punch shoe at a still further stage of the method of the present invention.

When the apparatus is in the position shown in FIG. 4, the next step is to strike the upper surface of the punch shoe 76 a heavy blow with a suitable means such as a lead hammer or the like to thereby cause the prick point and cutting edge of the spotting means to indent suitable marks in the under surface of the punch shoe. This is illustrated in FIG. 5 wherein it will be seen that the spotting means has actually entered the metal at the under surface of the punch shoe to provide suitable markings therein.

The next step of the method is to remove the punch shoe thereby disassembling the die set. The die shoe is then turned over from the position shown in FIG. 3, and utilizing the markings on the under surface of the punch shoe, holes for the punch retainer retainer screws are drilled in the punch shoe. These holes are indicated by reference numerals 80 in FIG. 6, these openings being shown as provided with counterbored portions 80' in order to adapt the punch shoe for back-mounting of the punch retainer thereon. It will of course be understood that if the punch retainer is to be face-mounted on the punch shoe, it is merely necessary to drill the screw receiving openings partway through the punch shoe from the face thereof, there being no necessity for a counterbored portion in such case. In the case of face-mounting, the screw receiving holes in the punch shoe must of course be threaded, whereas in the case of back-mounting, the holes drilled in the punch shoe need not be threaded, and may simply comprise clearance holes.

Figure 11:
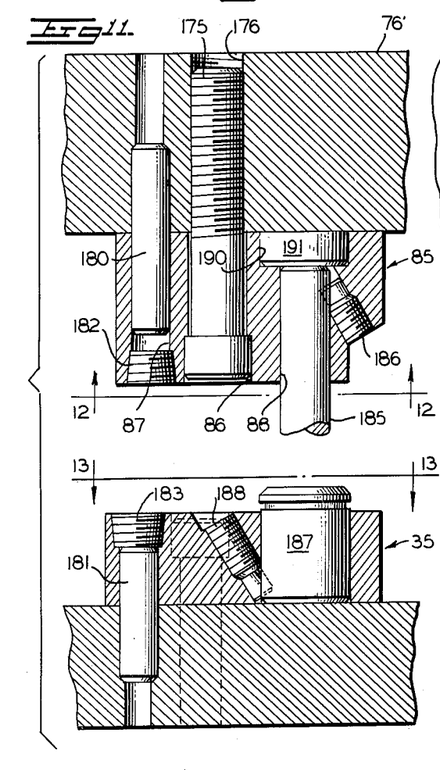
FIG. 11 is a view illustrating the manner in which the punch and die retainers may be face-mounted to their associated shoe.
Figure 12:
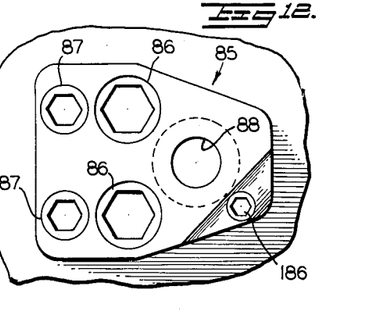
FIG. 12 is a bottom view of the punch retainer as seen along line 12—12 of FIG. 11 looking in the direction of the arrows.

A punch retainer of novel construction is indicated generally by reference numeral 85, this punch construction being seen most clearly in FIGS. 11 and 12. As seen especially in FIG. 12, it will be noted that the construction of a punch retainer is similar to the die retainer in the respect that a pair of spaced screw receiving openings 86 are provided, and a pair of spaced dowel receiving openings 87 are provided, the retainer also being provided with a tool receiving opening 88 which in this case is adapted to receive the punch.

The screw receiving openings 86 are of a similar construction to the screw receiving openings 87 of the die retainer, the openings each including a threaded portion and a counterbored end portion for a purpose hereinafter described. Further structural features of the punch retainer will be set forth hereinafter.

Figure 7:
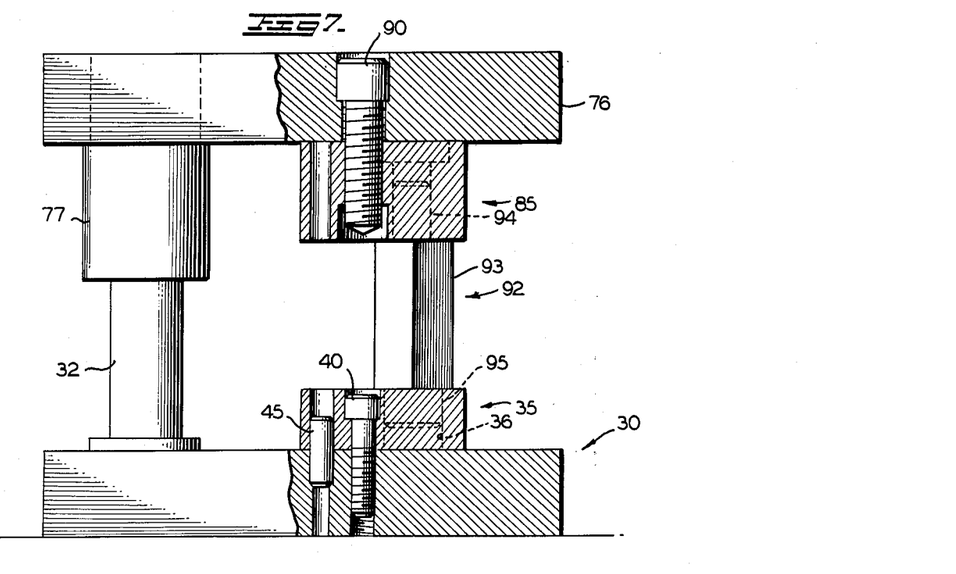
FIG. 7 is a side view partially in section illustrating a still further stage of the method.

After having formed the screw receiving holes in the punch shoe as set forth above and as illustrated in FIG. 6, the punch retainer is loosely fastened to the face of the punch holder. As seen in FIG. 7, the punch retainer 85 is shown as being back-mounted by means of retaining screws 90 which extend down through clearance openings in the punch shoe and are threaded into the threaded portions of the screw receiving openings in the punch retainer.

It is now necessary to properly align the punch and die retainers with each other and this is accomplished by means of a set-up plug indicated generally by reference numeral 92 as seen in FIG. 7. This set-up plug may be of conventional construction, and may be for example of the type shown in U.S. Patent No. 2,371,565.

The set-up plug as seen in FIG. 7 includes a main body portion 93 having end portions 94 and 95 which are adapted to be received within the punch receiving opening in the punch retainer and the die receiving opening in the die retainer respectively.

In the case where the punch receiving opening as well as the die receiving opening is cylindrical, the end portions 94 and 95 on the set-up plug 92 will also be cylindrical. On the other hand, where the punch receiving opening and the die receiving opening may be of an odd shape other than round, the end portions 94 and 95 of the set-up plug will be provided with flats which cooperate with flats provided on the holes in the retainers as will be understood from an inspection of the above-cited patent.

After the punch retainer has been properly aligned with the die retainer as discussed above, the punch retaining screws 90 are tightened to securely retain the punch in position on the punch shoe.

Figure 8:
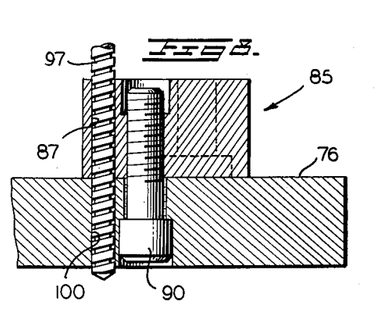
FIG. 8 is a sectional view illustrating a still further step of the method.

The die set is then again disassembled and the punch shoe and attached punch retainer are turned over and dowel receiving openings are drilled and reamed in the punch shoe by inserting the drilling and reaming tools through the dowel receiving openings of the punch retainer to thereby ensure absolute alignment of the dowel receiving holes in the punch shoe and punch retainer. This is illustrated in FIG. 8, wherein the punch shoe 76 and punch retainer 85 are shown in the inverted position, and a drilling indicated by reference numeral 97 is illustrated as extending down through the dowel opening 87 in the punch retainer, the drill having formed a dowel receiving opening 100 in the punch shoe.

Figure 9:
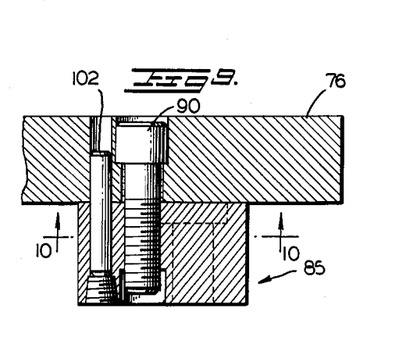
FIG. 9 is a sectional view illustrating a further step of the method.
Figure 10:
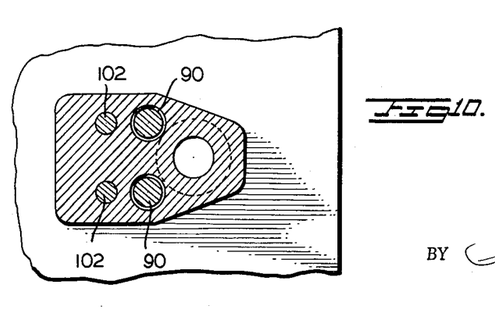
FIG. 10 is a sectional view taken substantially along line 10—10 of FIG. 9 looking in the direction of the arrows.

The next step of the method is to insert the dowels into their operative position in the aligned dowel receiving openings in the punch shoe and punch retainer, and as seen in FIG. 9, the dowels 102 each are driven into the position as shown in this figure, whereby the punch retainer is mounted on the punch shoe in such a manner that it can not move relative thereto.

At this point, it will be apparent that the method according to the present invention provides a means for efficiently aligning one of the retainers with respect to the other retainer. As mentioned previously, the spotting means on the spotting fixture may take various forms, and referring to FIGS. 22 and 23, a modified form of spotting means is illustrated, wherein the spotting means indicated generally by reference numeral 105 comprises a body portion 106 formed of steel or the like and having a downwardly extending threaded shank portion 107 which is adapted to be received in the threaded openings provided at the upper end of the spotting fixture, and in this instance, the upwardly directed portion 110 may comprise a rubber-like material which is bonded to the body portion 106.

Figure 22:
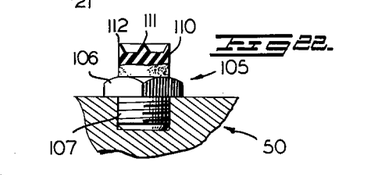
FIG. 22 is a view partially in section of a modified form of spotting means.
Figure 23:
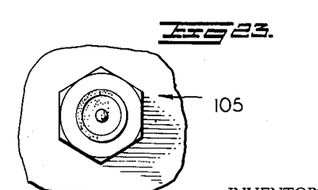
FIG. 23 is a top view of the spotting means shown in FIG. 22.

Portion 110 actually forms a rubber stamp which is adapted to be inked in a conventional manner and defines a center point 111 and an annular surrounding edge portion 112. It is apparent that when the under surface of a die shoe, for example, comes in contact with the inked upper edge of portion 110, the inked impression will be transferred to the upper surface of the punch shoe to indicate the position where holes are to be drilled in the punch shoe.

Figures 17, 18, 19:
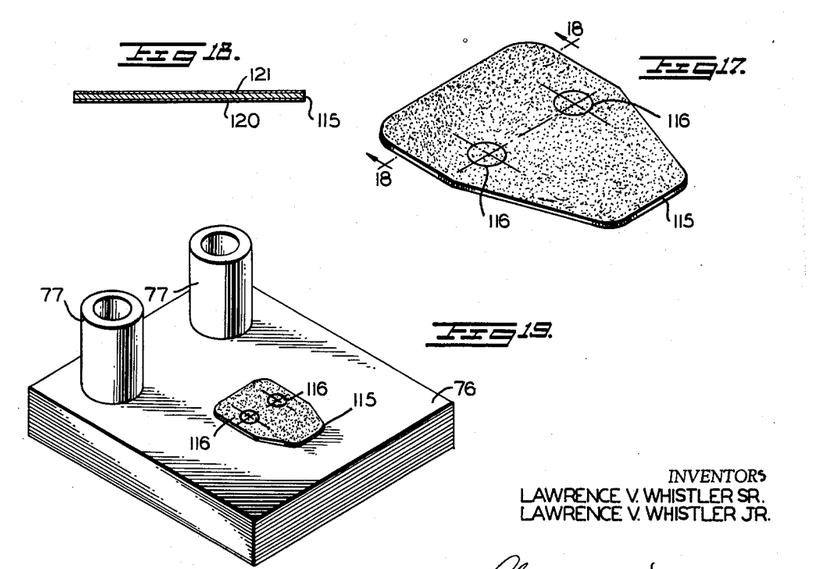
FIG. 17 is a perspective view illustrating a modified form of the spotting means.
FIG. 18 is a sectional view taken substantially along line 18—18 of FIG. 17, looking in the direction of the arrows.
FIG. 19 is a perspective view illustrating the spotting means as shown in FIG. 17 on the under surface of a punch shoe.

A further modified form of the transfer means of the present invention is illustrated in FIGS. 17–19. In this modification, a thin layer of material 115 such as plastic or the like is provided with markings indicated by reference numerals 116 in the form of circles which cross lines which, of course, accurately indicate the position where holes are to be drilled. This layer of material as seen in FIG. 18 may be provided with an adhesive substance 120 on the lower side thereof which is supported by the transfer means while a layer 121 of adhesive substance may be provided on the upwardly facing surface which is adapted to come into contact with a punch shoe for example.

The arrangement is such that the layer of adhesive 120 is adapted to adhere the sheet of material 115 to the upper surface of a supporting member, the sheet of material 115 being only lightly adhered by the layer of adhesive substance 120. On the other hand, the layer 121 of adhesive will provide a very strong adhesive bond with a shoe, whereby after the shoe has contacted layer 121 when the shoe is subsequently moved away, the sheet of material 115 will be securely bonded to the surface of the shoe and will pull away from its supporting surface to which it is only lightly adhered. For example, the sheet of material 115 may be adhered to the supporting surface only in certain spots, whereas the layer of adhesive 121 may extend over the entire surface of the sheet of material 115.

Figure 16:
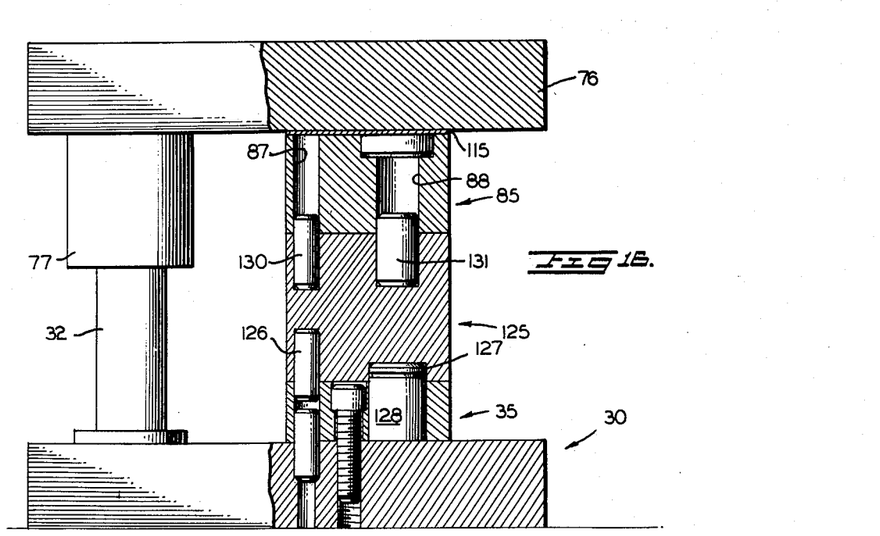
FIG. 16 is a side view partly in section illustrating a modification of the invention.

FIG. 16 illustrates one manner of carrying out the method of the present invention, wherein a modified form of spotting fixture or transfer means 125 is illustrated, this transfer means being provided with a dowel 126 adapted to fit within one of the dowel receiving openings in the die retainer 35, while a recess 127 is provided for receiving a die bushing 128 for example. The punch retainer 85 may be of the same construction as illustrated previously, and the upper end of the spotting fixture is provided with a pair of dowels 130 and 131 which are adapted to be received respectively within a dowel receiving opening 87 and the punch receiving opening 88 of the punch retainer.

In the modification shown in FIG. 16, the die retainer is first fixedly secured to the die shoe in the manner aforedescribed, whereupon the spotting fixture 125 is mounted upon the die retainer. The punch retainer 85 is then mounted in place on the spotting fixture as seen in FIG. 16. The spotting means as illustrated in FIG. 17 may be of the same outer configuration as the punch retainer, and this spotting means is shown in FIG. 16 as adhesively secured to the upper surface of the punch retainer. When the punch shoe 76 is then brought into contact with the spotting means as seen in FIG. 16, the spotting means will become adhered to the under surface of the punch shoe, and accordingly, when the punch shoe is again raised, the spotting means will pull away from the punch retainer, and be adhesively attached to the under surface of the punch shoe. The punch shoe may then be removed from the die set and inverted as seen in FIG. 19, whereupon the spotting means provides a clear visual indication of the exact position at which the holes are to be drilled in the punch shoe. It will of course be understood that the markings 116 on the spotting means are in exactly the same position as the screw receiving openings in the punch retainer as compared with the outer configuration of the punch retainer with which the outer configuration of the spotting means is identical.

After having formed the screw receiving holes in the punch retainer as indicated by the spotting means shown in FIG. 19, the remainder of the steps of aligning the punch and die retainers are identical with that previously discussed.

Figure 20:
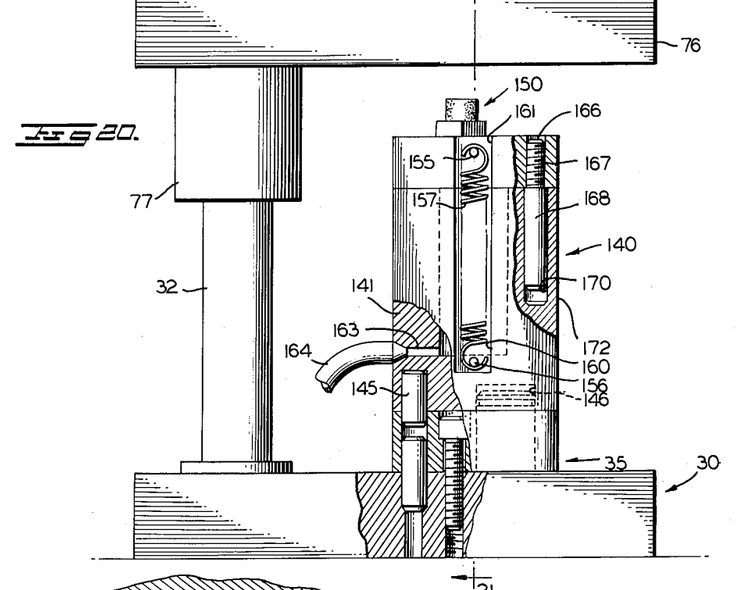
FIG. 20 is a side view partially in section illustrating a modified form of transfer means which is adapted to be remotely power operated.
Figure 21:
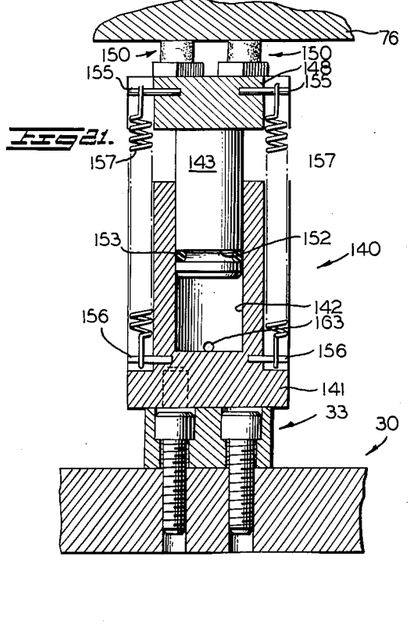
FIG. 21 is a sectional view taken substantially along line 21—21 of FIG. 20 looking in the direction of the arrows.

Referring now to FIGS. 20 and 21 of the drawings, a modified form of transfer means is illustrated which is adapted to be remotely power operated. When utilizing this form of the invention, the punch and die shoes are identical with that previously discussed, and the die retainer 35 is first mounted in the proper position on the die shoe as aforedescribed.

The transfer means of this modification illustrated generally by reference numeral 140 includes a main body portion 141 defining a central cavity or cylinder 142 therein which is adapted to slidably receive a piston member 143. At the lower end of body portion 141, a downwardly directed dowel 145 is provided along with a recess 146, the dowel and recess serving as an aligning means as aforedescribed in connection with the other transfer means.

Piston member 143 is provided with an enlarged upper portion 148 upon which is mounted suitable spotting means indicated by reference numerals 150 and which are shown as being of the form illustrated in FIGS. 22 and 23. The lower end of the piston is provided with an annular groove 152 within which is mounted a conventional O-ring 153 adapted to seal the piston with respect to the wall of the cylinder 142. A pair of diametrically opposite radially outwardly extending pins 155 are provided on the enlarged portion 148 of the piston, and a corresponding pair of diametrically opposite radially outwardly extending pins 156 are provided on the main body portion 141. A pair of tension springs 157 have the opposite ends thereof connected to pins 155 and 156 respectively, the main body portion 141 and enlarged portion 148 of the piston being provided with grooves 160 and 161 respectively adapted to receive said tension springs. It is apparent that the tension springs normally tend to bias the piston to its downward released or inoperative position.

An inlet passage 163 is disposed in communication with the lower end of cylinder portion 142 and receives a flexible conduit 164 which is connected with a suitable source of fluid under pressure for remotely operating piston 143 in a well-known manner. It is apparent that fluid pressure introduced through passage 163 will move the piston upwardly into its operative position as shown in FIG. 21, wherein the spotting means 150 engages the under surface of the punch shoe 76.

In order to maintain the piston properly aligned with the main body portion 141 and to prevent any relative rotation therebetween, a vertically extending threaded opening 166 is provided through enlarged portion 148 of the piston, and the threaded shank 167 of a guide pin 168 is threaded within opening 166. Guide pin 168 is snugly received within a vertically extending opening 170 provided in the main body portion 141, it being apparent that the guide pin will prevent any relative rotation between the piston and main body portion. A vent opening 172 is provided from the lower end of opening 170 to atmosphere in order to assure that the guide pin 168 is adapted to freely reciprocate within opening 170.

It is apparent that the remotely power operated transfer means as seen in FIGS. 20 and 21 may be utilized in the method as aforedescribed, the only difference being that it is not necessary to move the punch shoe down into engagement with the transfer means, but on the contrary, the punch shoe is retained in its position and the transfer means is moved upwardly into engagement with the under surface of the punch shoe.

Referring back now to the specific construction of the retainers of the present invention, it was previously pointed out that the screw receiving openings of these retainers are of a special construction to permit either face-mounting or back-mounting of the retainers. This can be best understood by a comparison of FIGS. 9 and 11 of the drawings which respectively illustrate a punch retainer as being back-mounted and face-mounted. As seen in FIG. 9, the punch retainer is back-mounted whereby a retaining screw 90 extends through a clearance opening in the punch shoe and is threaded into the threaded portion of the screw receiving opening in the punch retainer. As seen in FIG. 11, the retaining screw 175 has the enlarged head thereof disposed within the unthreaded counterbored portion of the screw receiving hole in the punch retainer, while the threaded shank of the retaining screw is threaded into a threaded opening 176 provided through the punch shoe 76'.

It will be noted that when the retainer is face-mounted as seen in FIG. 11, the retaining screw 175 has a clearance with the threaded portion of the screw receiving hole in the retainer.

An additional novel feature of the punch and die retainers of the present invention may be clearly understood from an inspection of FIG. 11. As seen in this figure, dowels 180 are associated with the punch retainer and dowels 181 are associated with the die retainer for maintaining the retainers in their proper positions.

It has been found in actual practice that in fast-speed, high production jobs, the dowel will work loose, particularly in the case of the punch retainer, and it is quite possible that the dowel may drop completely out of the opening in the punch retainer for example.

In order to positively prevent the dowels from escaping from the retainers, the outer end of each of the dowel receiving openings in the retainers are provided with tapered threads which are adapted to receive conventional tapered pipe plugs illustrated by reference numerals 182 and 183 respectively. These tapered pipe plugs may be provided with a hex socket in the end thereof for facilitating insertion and removal thereof. It is apparent that when the tapered pipe plugs are threaded into the position shown, they will be wedged tightly in position and it will be impossible for the dowels 180 and 181 to escape from the retainers.

As seen in FIG. 11, a punch is indicated by reference numeral 185, this punch being retained in operative position by a set screw 186 adapted to engage in a suitable notch provided in the punch in a well-known manner. The disposition of the locking set screw 186 will be clearly understood from an inspection of FIGS. 11 and 12.

Figure 13:
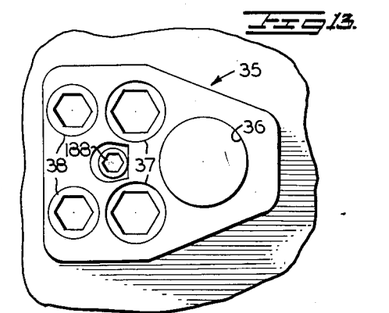
FIG. 13 is a top view of the die retainer as seen along line 13—13 of FIG. 11, looking in the direction of the arrows.

The die bushing 187 shown in FIG. 11 is retained in operative position by means of a set screw 188, which is adapted to seat within a suitable recess formed in the die bushing in a well-known manner. The disposition of set screw 188 will be clearly understood from an inspection of FIGS. 11 and 13.

Referring particularly to FIG. 11, it will be noted that the upper end of the punch receiving opening 88 provided in the punch retainer is provided with a large recess 190 of substantially cylindrical configurations. Disposed within this recess is a hardened steel back-up insert 191, the back-up insert being retained in operative position within the punch retainer by being swaged into place. This built-in back-up insert 191 serves to distribute the loads from the punch 185 over a large enough area of the punch shoe to prevent damage to the punch shoe, and it will be noted that the outer surface of the back-up insert 191 is flush with the adjacent surface of the punch retainer such that the punch retainer may be mounted directly against the face of the punch shoe.

It is apparent from the foregoing that there is provided a new and novel method of aligning punch and die retainers with great accuracy which results in a considerable saving in time involved in setting up a die set including custom punch and die retainers. A transfer means is provided which is simple and inexpensive in construction and yet which is efficient and reliable in use and provides a clear visible indication of the position in which mounting holes are to be formed in a shoe. Various forms of spotting means are disclosed for providing such visible indication, and in addition, a novel remotely power operated transfer means is provided. Both the punch and die retainers of the present invention are provided with special screw receiving openings to permit either face-mounting or back-mounting of the retainers on the associated shoes, and special plug means is provided for positively retaining the dowels in place within the retainers and preventing accidental escape therefrom. The punch retainer according to the present invention is also provided with a novel built-in back-up insert which eliminates the necessity of providing a separate back-up plate and enables the punch retainer to be directly mounted upon the face of an associated punch shoe.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. The method of aligning the punch and die retainers of a die set comprising fixedly mounting a first retainer upon an associated shoe in the proper position, mounting a spotting fixture on said first retainer so as to prevent relative rotation therebetween, bringing a supporting shoe into contact with an upper portion of said spotting fixture to provide an indication on the under surface of the supporting shoe of the proper position of mounting holes, removing said supporting shoe from contact with said spotting fixture and forming mounting holes in the supporting shoe, loosely mounting a second retainer on said supporting shoe by inserting attaching means in said mounting holes, then accurately aligning the first and second retainers, and then securing said second retainer in final fixed position on said supporting shoe.

2. The method of aligning punch and die retainers of a die set comprising providing a first retainer having screw receiving holes and dowel receiving holes therein, providing a first shoe, forming screw receiving holes in said shoe, inserting screws through aligned screw receiving holes in said first retainer and said first shoe, and securing said first retainer in fixed position on said first shoe, forming dowel receiving holes in said first shoe by inserting drilling means and drilling through the dowel holes in said first retainer, placing dowels in the aligned dowel holes in the first retainer and the first shoe, engaging a transfer means with said first retainer so as to be non-rotatable with respect thereto, providing a second shoe, guiding said second shoe so as to move in a predetermined manner with respect to said first shoe and bringing said second shoe into engagement with an upper portion of said transfer means so as to indicate the position of screw receiving holes on the under surface of said second shoe, removing said second shoe from contact with said transfer means, forming screw receiving holes in said second shoe, providing a second retainer having screw receiving holes and dowel receiving holes therein, inserting screws through aligned screw receiving holes in said second retainer and said second shoe to loosely secure said second retainer to said second shoe, engaging a set-up plug with said first and second retainers to properly align the two retainers with one another, tightening up said last-mentioned screws to permanently secure said second retainer to said second shoe, forming dowel receiving holes in said second shoe by inserting drilling means through the dowel holes in said second retainer, and placing dowels in the aligned dowel holes in the second retainer and the second shoe.

3. The method of aligning a punch retainer and a die retainer on their associated shoes comprising a die retainer having a plurality of screw receiving holes and a plurality of dowel receiving holes formed therethrough, providing a die shoe, forming screw receiving holes in the die shoe and inserting screws through the aligned screw receiving holes in the die retainer and die shoe, tightening the screws to fix the die retainer in proper position on the die shoe, drilling and reaming the die shoe through the dowel receiving holes in the die retainer to form aligned dowel receiving holes in the die shoe, inserting dowels within the aligned dowel receiving holes in the die retainer and the die shoe, providing a transfer means having locating means at one end thereof and spotting means at the opposite end thereof, engaging the locating means of the transfer means with the die retainer to align the transfer means with the die retainer and prevent relative rotation therebetween, providing a punch shoe, guiding the movement of the punch shoe with regard to the die shoe to ensure accurate alignment therebetween, and moving the punch shoe toward the die shoe until the under surface of the punch shoe engages the spotting means at one end portion of the transfer means whereby the spotting means indicates the position for forming screw receiving holes in the punch shoe, moving the punch shoe away from the die shoe, forming screw receiving holes in the punch shoe as indicated by the spotting means, providing a punch retainer having screw receiving holes and dowel receiving holes formed therethrough, inserting screws through aligned screw receiving holes in the punch shoe and the punch retainer to fasten the punch retainer directly to the face of the punch shoe, engaging set-up means with the punch and die retainers to properly align the punch and die retainers with one another, tightening the screws associated with the punch retainer to fix the punch retainer in desired position on the punch shoe, drilling and reaming the punch shoe through the dowel receiving holes in the punch retainer to form aligned dowel receiving holes in the punch shoe, and inserting dowels within the aligned dowel receiving holes in the punch retainer and the punch shoe.

4. The method as defined in claim 3, including the step of striking the upper surface of the punch shoe a heavy blow after the under surface of the punch shoe has been moved into contact with the spotting means of the transfer means in order to provide a visible indication of the proper location of the screw receiving holes in the under surface of the punch shoe.

5. The method of aligning the punch and die retainers of a die set comprising fixedly mounting a first retainer upon an associated shoe in the proper position, mounting transfer means on said first retainer so as to prevent relative rotation therebetween, the transfer means having a movable end portion with spotting means thereon adapted to be moved away from the first retainer, providing a supporting shoe in spaced relationship to said first-mentioned shoe, moving the movable end portion of said transfer means while the remainder of the transfer means remains stationary to bring the spotting means thereof into engagement with the under surface of said supporting shoe to provide an indication on the under surface of the supporting shoe of the proper position of mounting holes, forming mounting holes in the supporting shoe, loosely mounting a second retainer on said supporting shoe by inserting attaching means in said mounting holes, then accurately aligning the first and second retainers, and then securing said second retainer in final fixed position on said supporting shoe.

6. The method of aligning a punch retainer and a die retainer comprising providing a die shoe having guide means extending therefrom, providing a die retainer having screw receiving holes, dowel receiving holes, and a die receiving hole, properly placing the die retainer on the die shoe, marking on the die shoe the position of screw receiving holes, drilling and tapping screw receiving holes in the die shoe, placing the die retainer on the shoe and inserting screws through the aligned screw receiving holes in the die retainer in the die shoe, adjusting the die retainer to its desired final position, tightening said screws to secure the die retainer to the die shoe, drilling and reaming the die shoe through the dowel receiving holes in the die retainer to provide dowel receiving holes in the die shoe, driving dowels into the aligned dowel holes in the die retainer and the die shoe, providing a transfer means having aligning means at one end thereof and spotting means at the other end thereof, engaging the aligning means of the transfer means with portions of the die retainer to align the transfer means with the die retainer and prevent relative rotation therebetween, providing a punch shoe having guide means extending therefrom, engaging the guide means of the punch shoe with the guide means of the die shoe to accurately guide movement of the punch shoe with respect to the die shoe, bringing the under surface of the die shoe into engagement with the spotting means of the transfer means to provide an indication of the proper location of screw receiving holes in the punch shoe, disengaging the guide means of the punch shoe and die shoe and forming screw receiving holes in the punch shoe, providing a punch retainer having screw receiving holes and die receiving holes formed therethrough, and having a punch receiving hole therein, fastening the punch retainer loosely and directly to the face of the punch shoe by inserting screws through the aligned screw receiving holes in the punch retainer and the punch shoe, providing a set-up plug having means at the opposite end portions thereof for cooperating with the punch and die retainers for accurately aligning the punch and die retainers with respect to one another, tightening the screws associated with the punch retainer for securing the punch retainer in the desired position relative to the punch shoe, drilling and reaming the punch shoe through the dowel receiving holes provided in the punch retainer to form dowel receiving holes in the punch shoe, and driving dowels into the aligned holes formed in the punch retainer and the die retainer.

7. Transfer means for aligning a punch retainer and a die retainer upon associated shoes comprising a body means having aligning means at one end thereof comprising spaced smooth surfaced portions adapted to engage and cooperate with a retainer to properly align the body means with a retainer and prevent relative rotation therebetween, and spotting means supported by the opposite end of said body means, said spotting means including a sheet of material having an outwardly directed face, an adhesive substance on at least a portion of said outwardly directed face, said adhesive being adapted to adhere the sheet of material to a surface of a shoe so as to retain the sheet of material on the shoe when the transfer means and shoe are separated from one another, said spotting means including preformed markings thereon to indicate the position for forming hole means in the associated shoe.

8. Transfer means comprising a body means defining a cylinder, aligning means at one end of said body means for cooperating with a retainer to properly align the body means with a retainer and prevent relative rotation therebetween, a piston member slidably disposed within said cylinder, said piston member having spotting means at the outer end portion thereof adapted to engage a shoe and provide a visible indication of the proper position for attaching means, said spotting means comprising a member having an annular cutting edge formed thereon, and a prick point being formed at a central position within said annular cutting edge, resilient means normally biasing said piston to its innermost position within the cylinder, means for introducing fluid pressure into said cylinder for actuating the piston towards the outer position for engaging a shoe, and cooperating engaging means connected with said cylinder and said piston and serving to guide the movement of the piston with respect to the cylinder and preventing rotation therebetween.

9. Transfer means for aligning a punch retainer and a die retainer upon associated shoes comprising, a block of hard strong material, said block having aligning means at one end thereof, said aligning means including a dowel extending outwardly of said block and adapted to fit within a cooperating opening in a retainer, said aligning means also including a recess formed in said block spaced from said dowel and adapted to cooperate with a dowel extending from said retainer whereby said block is adapted to be positively and non-rotatably positioned with respect to a retainer, the opposite end of said block having at least one hole therein, spotting means comprising a member having a shank portion, said shank portion being received in said hole for mounting said spotting means in operative position at said last mentioned end of the block, said spotting means having an outwardly facing annular cutting edge formed thereon, and a prick point being formed at a central position within said annular cutting edge and extending longitudinally of the member beyond the annular cutting edge such that the prick point is adapted to engage a surface prior to engagement of such surface by the annular cutting edge.

10. Transfer means for aligning punch and die retainers of a die set and including a body means, aligning means at one end of said body means comprising spaced smooth surfaced portions adapted to cooperate with a retainer to properly align the body means with a retainer and prevent relative movement therebetween, spotting means supported by the opposite end of the body means and including means for engaging a shoe and providing an indication on a shoe of the proper position for providing means for attaching a retainer thereto, said aligning means comprising an outwardly extending projection and an opening adapted to receive inserts having aligned portions of different sizes for cooperating with different retainers.

References Cited in the file of this patent
UNITED STATES PATENTS

| | | |
|---|---|---|
| 2,092,653 | Nielsen | Sept. 7, 1937 |
| 2,369,223 | Ferger | Feb. 13, 1945 |
| 2,371,565 | Whistler | Mar. 13, 1945 |
| 2,504,642 | Burgess | Apr. 18, 1950 |
| 2,642,138 | Macewka | June 16, 1953 |
| 2,675,625 | Rayl | Apr. 20, 1954 |
| 2,731,729 | Tomaska | Jan. 24, 1956 |
| 2,764,817 | Schwartz | Oct. 2, 1956 |
| 2,765,036 | Harper | Oct. 2, 1956 |
| 2,771,947 | Cefaly | Nov. 27, 1956 |
| 3,027,792 | Hohl | Apr. 3, 1962 |
| 3,027,793 | Sommer | Apr. 3, 1962 |
| 3,064,511 | Allander | Nov. 20, 1962 |